C. TYRRELL.
Barrel-Heading Press.
No. 223,302.        Patented Jan. 6, 1880.
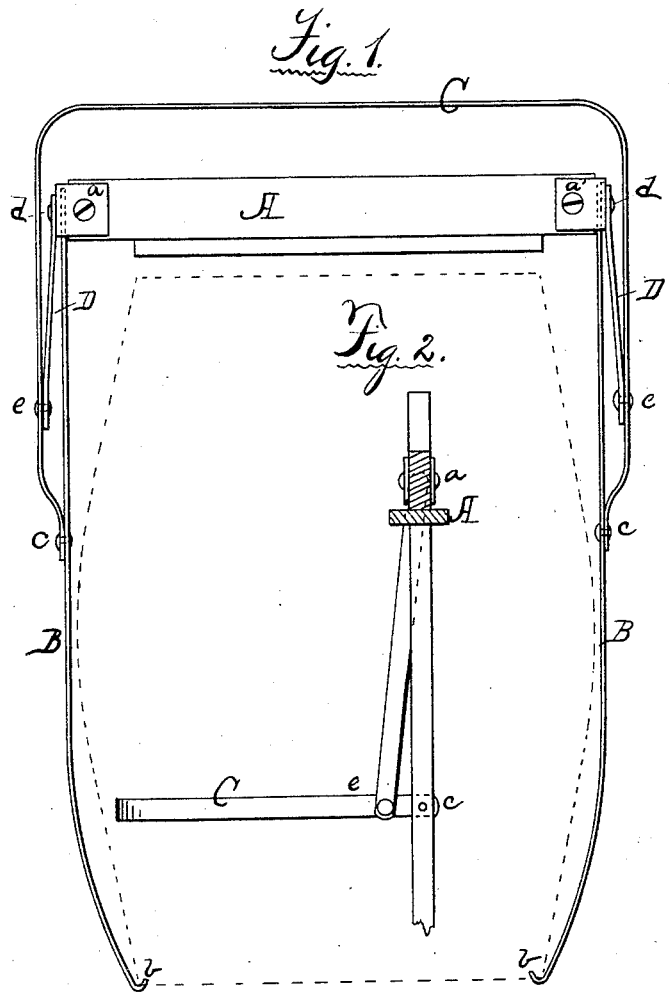
Witnesses.
J. H. Parsons.
J. R. Drake.
Charles Tyrrell
Inventor, by
J. R. Drake,
Atty.

UNITED STATES PATENT OFFICE.

CHARLES TYRRELL, OF CORFU, NEW YORK.

BARREL-HEADING PRESS.

SPECIFICATION forming part of Letters Patent No. 223,302, dated January 6, 1880.

Application filed October 9, 1879.

*To all whom it may concern:*

Be it known that I, CHARLES TYRRELL, of Corfu, in the county of Genesee and State of New York, have made certain Improvements in Barrel-Heading Presses, of which the following is a specification.

This invention relates to devices for pressing and holding down the heads of fruit and other barrels while being nailed or fastened in place, the object being to get a simple device that will hold the heads squarely down by a direct draft; and the invention consists in the arrangement of the parts, all as fully hereinafter explained.

In the drawings, Figure 1 is a side elevation of the device ready to set about a barrel. Fig. 2 is a side view in cross-section, showing the position when the follower is pressed down.

A represents the presser-head or follower, constructed as usual, and having at each end yokes $a$ $a'$ attached thereto, in which slide the upper ends of the side bars B B. These, at the lower ends, are bent in, forming hooks $b$ $b$, which catch the ends of the barrel-staves, while the follower A stands just over the top of the barrel, as shown in Fig. 1.

C is the bail or operating-handle, pivoted to the side bars at $c$ $c$, and having a free movement up and down and over the bulk of the barrel either side.

D D are two short side straps, pivoted at $d$ $d$, at the upper ends, to the yokes $a$ $a'$, and at the bottom ends to the bail C at $e$ $e$, a short distance from the upright side pieces B B. (Shown more particularly in Fig. 2.) These, in connection with the bail or handle C, act as levers to draw down the follower.

The operation of the device is very simple. The hooks $b$ $b$ of the side pieces B are caught on the lower edge of the barrel, the follower A and the bail C standing upright over the center of the top of the barrel. The loose pieces of the barrel-top are then set in place, the joints crossing the bottom of the follower A at complete right angles. The operator then takes the handle or bail at the top and from either side of the barrel, and draws it toward him and downward over the side of the barrel. This brings the follower A down on the head-pieces and presses them down in place, notwithstanding the resistance offered by the filling of the barrel. He then puts his foot or knee on the bail as it stands in position shown in Fig. 2, and proceeds to nail the head in. When this is done he releases the bail, raises it, and lifts the whole thing off and puts it on the next barrel, and so on.

By this arrangement of the side pieces and short straps a direct draft is got, the follower is kept perfectly level, pressing the heads down evenly. It can be worked from either side of the barrel, and not in only one position, as is the case with those I am acquainted with.

This bail C, sitting so closely to the barrel, is also an improvement, as it is not in the way of the operator while nailing on the head.

By putting a series of holes in the side pieces B at or near $c$ $c$, and thus lowering the bail, it can be accommodated to different sizes of barrels.

I claim—

In a barrel-heading press, the side bars B B, made in one piece, the follower A, having the yokes $a$ $a$ attached to the ends thereof, in which the upper ends of the side bars slide, and the side straps D D, pivoted to the yokes at $d$ $d$, all constructed, arranged, and operating substantially as and for the purpose specified.

In witness whereof I have hereunto signed my name in the presence of two subscribing witnesses.

CHARLES TYRRELL.

Witnesses:
H. B. FERREN,
WM. J. TYRRELL.